United States Patent
Van Rompaey et al.

(10) Patent No.: US 7,715,292 B2
(45) Date of Patent: May 11, 2010

(54) DRIVE AND METHOD FOR DETERMINING THE TYPE OF OPTICAL RECORD CARRIER

(75) Inventors: Bart Van Rompaey, Eindhoven (NL); Andrei Mijiritskii, Eindhoven (NL); Maarten Kuijper, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 570 days.

(21) Appl. No.: 11/573,296

(22) PCT Filed: Aug. 5, 2005

(86) PCT No.: PCT/IB2005/052613

§ 371 (c)(1),
(2), (4) Date: Feb. 6, 2007

(87) PCT Pub. No.: WO2006/016338

PCT Pub. Date: Feb. 16, 2006

(65) Prior Publication Data

US 2008/0013416 A1 Jan. 17, 2008

(30) Foreign Application Priority Data

Aug. 10, 2004 (EP) .................................. 04103842

(51) Int. Cl.
*G11B 7/00* (2006.01)
(52) U.S. Cl. ................. 369/53.2; 369/44.41; 369/44.28; 369/44.13
(58) Field of Classification Search ........................ None
See application file for complete search history.

(56) References Cited

U.S. PATENT DOCUMENTS 5,701,384 A 12/1997 Park (Continued)

FOREIGN PATENT DOCUMENTS

EP 1187111 B1 6/2004

(Continued)

OTHER PUBLICATIONS

ISR: PCT/IB2005/052613.

(Continued)

*Primary Examiner*—Muhammad N. Edun

(57) ABSTRACT

The present invention relates to a drive for accessing an optical record carrier (2) comprising means (4) for determining the type of record carrier, in particular for distinguishing a read-only record carrier from a recordable or rewritable record carrier having a wobbled groove in the lead-in zone, said means comprising: a DPD measuring unit (41) for measuring the differential phase detection (DPD) signal, a PP measuring unit (42) for measuring the push-pull (PP) signal in case no DPD signal could be measured, a wobble locking unit (43) for locking, in case a PP signal could be measured, to the wobble embedded in said wobbled groove using a first and/or a second polarity setting, and an indication unit (44) for generating a first indication signal indicating that the record carrier is a read-only record carrier if a DPD signal could be measured and that the record carrier is a recordable or rewritable record carrier if no DPD signal but a PP signal could be measured and if locking to the wobble has been successful. In a further embodiment a second indication signal in generated indicating the type of polarity in case of a recordable or rewritable record carrier.

11 Claims, 4 Drawing Sheets

U.S. PATENT DOCUMENTS

Figure 1:
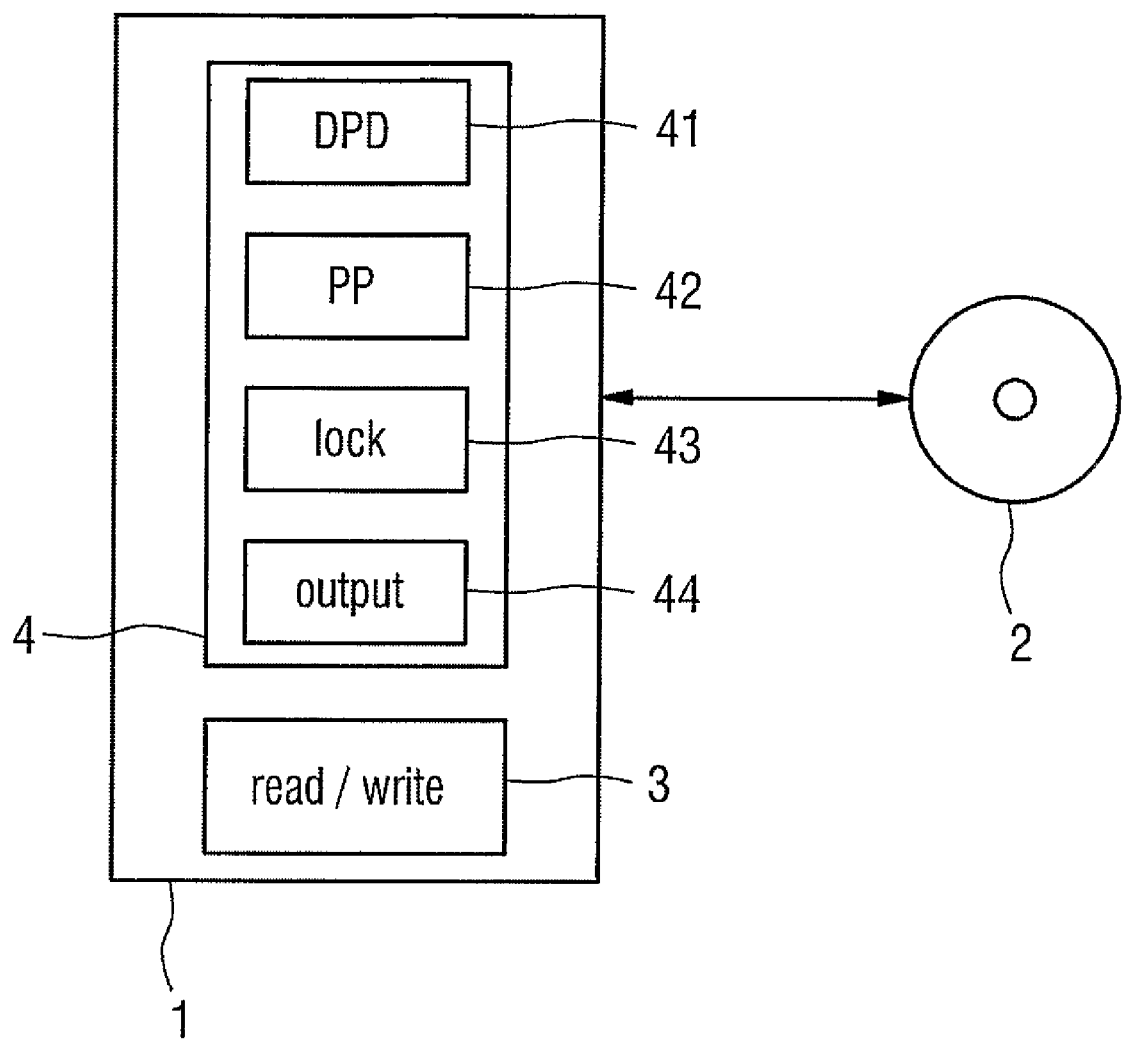

| | | |
|---|---|---|
| 6,411,577 B1 | 6/2002 | Hirose |
| 6,597,642 B1 | 7/2003 | Ijima et al. |
| 7,362,681 B2 * | 4/2008 | Tawaragi .................. 369/53.23 |
| 2003/0227853 A1 | 12/2003 | Kim et al. |
| 2004/0165491 A1 | 8/2004 | Wang |
| 2004/0213099 A1 | 10/2004 | Lee |
| 2005/0063261 A1 * | 3/2005 | Kim et al. ................. 369/44.26 |

FOREIGN PATENT DOCUMENTS

| | | |
|---|---|---|
| EP | 1111599 B1 | 5/2005 |
| WO | 2004006231 A1 | 1/2004 |
| WO | 2004019331 A1 | 3/2004 |

OTHER PUBLICATIONS

Written Opinion: PCT/IB2005/052613.

* cited by examiner

DRIVE AND METHOD FOR DETERMINING THE TYPE OF OPTICAL RECORD CARRIER

The present invention relates to a device, in particular to an optical disc drive, for accessing an optical record carrier, said device comprising means for determining the type of the record carrier, in particular for distinguishing a read-only type record carrier from a recordable or rewritable type record carrier having a wobbled groove. The present invention further relates to a corresponding method of determining the type of the optical record carrier and to a computer program for implementing said method on a computer.

In optical data storage systems data is stored in the data layer of an optical record carrier such as an optical disc. Typically, data bits are placed onto the disc in the form of a concentric spiral. The winds of such a spiral form data tracks. To access the data on the disc a radiation beam, such as a laser beam, is used which is brought onto the disc with the help of, among others, an optical pick-up unit (OPU). In order to successfully read/write data on the disc this OPU needs to follow the tracks during rotation of the disc. For this purpose a servo system is installed that uses a tracking signal generated by the disc.

Depending on the way the data is placed into the disc, three types of optical media are distinguished. One is the read-only memory (ROM). In this case the data is replicated into the disc in the form of data pits and cannot be altered anymore. Another type is the recordable (R) or write-once (WO) media, often both referred to as R media. In such media a user can write his own data on the disc once and read it out many time. The third type is the rewritable media (RW or RE). Such media can be rewritten and read-out by the user many times. The R, RW, and RE media are generally purchased blank, whereas the ROM always carries data.

For tracking purposes blank recordable and rewritable optical disc generally have a track formed by a groove in the disc. Now data may be recorded either in the groove (in-groove), on the area between the grooves (on-groove), or both. The way the data is recorded is generally referred to as tracking polarity.

In some optical recording systems, such as for example Blu-ray Disc (BD), both an in-groove and an on-groove tracking polarity is allowed for blank recordable and rewritable discs including dual- or multi-layer versions). This results in both in-groove and on-groove type of media. This allows for low-cost media manufacturing because of the flexibility in recording material type and disc manufacturing process.

As a consequence a disc drive will not know the tracking polarity of a disc, such as a BD-disc, in advance. It needs to determine the tracking polarity each time during disc start-up. This disc startup preferably does not cost much start-up time.

During start-up a drive may have to distinguish between ROM type media and recordable or rewritable type media. It is not guaranteed that (partly) recorded BD-R and BD-RE discs do not have any substantial differential phase detection (DPD) signal normally observed in ROM discs, i.e. it is possible that (partly) recorded BD-R and BD-RE discs have a DPD signal. Also the amplitude of the push-pull (PP) signal is not sufficient to determine the disc type. Although a PP signal is generally observed in recordable and rewritable media having a groove, a ROM disc also generates some push-pull signal.

It is the object of the present invention to provide means, and a corresponding method, for determining the type of record carrier, in particular which allows to distinguish between a read-only (ROM) type record carrier and a recordable/rewritable (R/RE) type record carrier quickly and uniquely, assuming that it is already known to which particular optical storage system family, such as CD, DVD or BD, the particular record carrier belongs.

This object is achieved according to the present invention by providing a drive as claimed in claim 1 or 2 having means for determining the type of record carrier which comprise:
- a DPD measuring unit for measuring the differential phase detection (DPD) signal,
- a PP measuring unit for measuring the push-pull (PP) signal in case no DPD signal could be measured,
- optionally a wobble locking unit for locking to a wobble embedded in a wobbled groove using a first and/or a second polarity setting in case a PP signal could be measured, and
- an indication unit for generating a first indication signal indicating that the record carrier is a read-only type record carrier if a DPD signal could be measured and that the record carrier is a recordable or rewritable record carrier if no DPD signal but a PP signal could be measured and, optionally, if locking to the wobble has been successful.

A corresponding method of determining the type of optical record carrier according to the present invention is defined in claims 9 and 10. Claim 11 defines a computer program comprising program code means for causing a computer to carry out the steps of the method as claimed in claim 8 when said computer program is run on a computer. Preferred embodiments of the invention are defined in the dependent claims.

The invention is based on the idea to make use of the measurement of the differential phase detection (DPD) signal and the push-pull (PP) signal to distinguish between a read-only and a recordable/rewritable record carrier. These two types of signals are typically used for tracking. The DPD signal is usually used for tracking of ROM type media where data bits are always present. Thus, in case a DPD signal can be measured it is very likely that the present record carrier is a ROM type record carrier since on recordable or rewritable media there are generally no data bits present so that no DPD signal can be generated.

In the latter case, that is when no DPD signal can be generated, a PP signal is measured in addition. Such a PP signal is zero on the tracks and in between the tracks, but has a different tracking polarity for both these cases. For rewritable and recordable media a mastered pre-groove with a known wobble feature is generally present on the disc. Thus, at maximum two different polarity settings are to be used in a further step for locking to the wobble in the pre-groove in case a PP signal could be measured. When locking was successful with one of the two polarity settings it is then very likely that the present record carrier is a recordable or rewritable type record carrier. When locking is not possible the record carrier is assumed not to be from the initially assumed optical storage system family (for example it is not a BD disc in case this has been initially assumed).

The determined type of record carrier can then be indicated by means of a first indication signal, so that the drive can continue with the appropriate start-up sequence for accessing the record carrier.

The present invention thus provides a solution for quickly distinguishing between a read-only type and a recordable or rewritable type record carrier assuming that it is beforehand known to which particular storage system family, for example CD, DVD or DB, the disc belongs.

By a preferred embodiment as defined in claim 2 it is further possible to determine the tracking polarity for a recordable and rewritable record carrier, in particular by a further adaptation of the indication unit. In this adaptation the indication unit further generates a second indication signal indicating that the recordable or rewritable record carrier has a first or a second tracking polarity depending on the polarity setting for which the locking to the wobble in the groove has been successful in a previous locking step.

In a further embodiment of the invention the indicating unit may be adapted to additionally indicate in the first indication signal that the record carrier is of a different optical record carrier family in case no PP signal could be measured or locking to the wobble in the groove has not been successful. Thus, in such a case, the drive may output a corresponding error signal or may use a different start-up procedure.

The wobble locking unit is preferably adapted such that in a first step a first polarity setting is used for locking to the wobble embedded in the wobbled groove, in particular a polarity setting occurring the most in recordable or rewritable record carriers of a specific family, and that a second polarity setting is used in a subsequent step in case locking was not successful using the first polarity setting. This is a time effective solution for finding the correct polarity setting. Since at present the most occurring polarity appears to be an on-groove polarity said first polarity setting is preferably an on-groove polarity setting and said second polarity setting is preferably an in-groove polarity setting.

Furthermore, the present invention is preferably applied for determining the type of record carrier among the different types of record carriers of the BD family, i.e. for distinguishing between a BD-ROM, BD-R or BD-RE disc. However, the invention can be applied in any other optical storage systems involving the same above described problem as well, provided a DPD signal and a PP signal can be measured and provided the recordable or rewritable record carrier has a wobbled groove.

Since recordable and rewritable discs might have some amount of DPD signal when user data is present, that is, it is not always guaranteed that there is a ROM type disc when a DPD signal is measured, the DPD measuring unit is preferably adapted for accessing an area on the disc for measuring the DPD signal where writing is prohibited, such as for example the PIC area on a BD disc.

Figure 2:
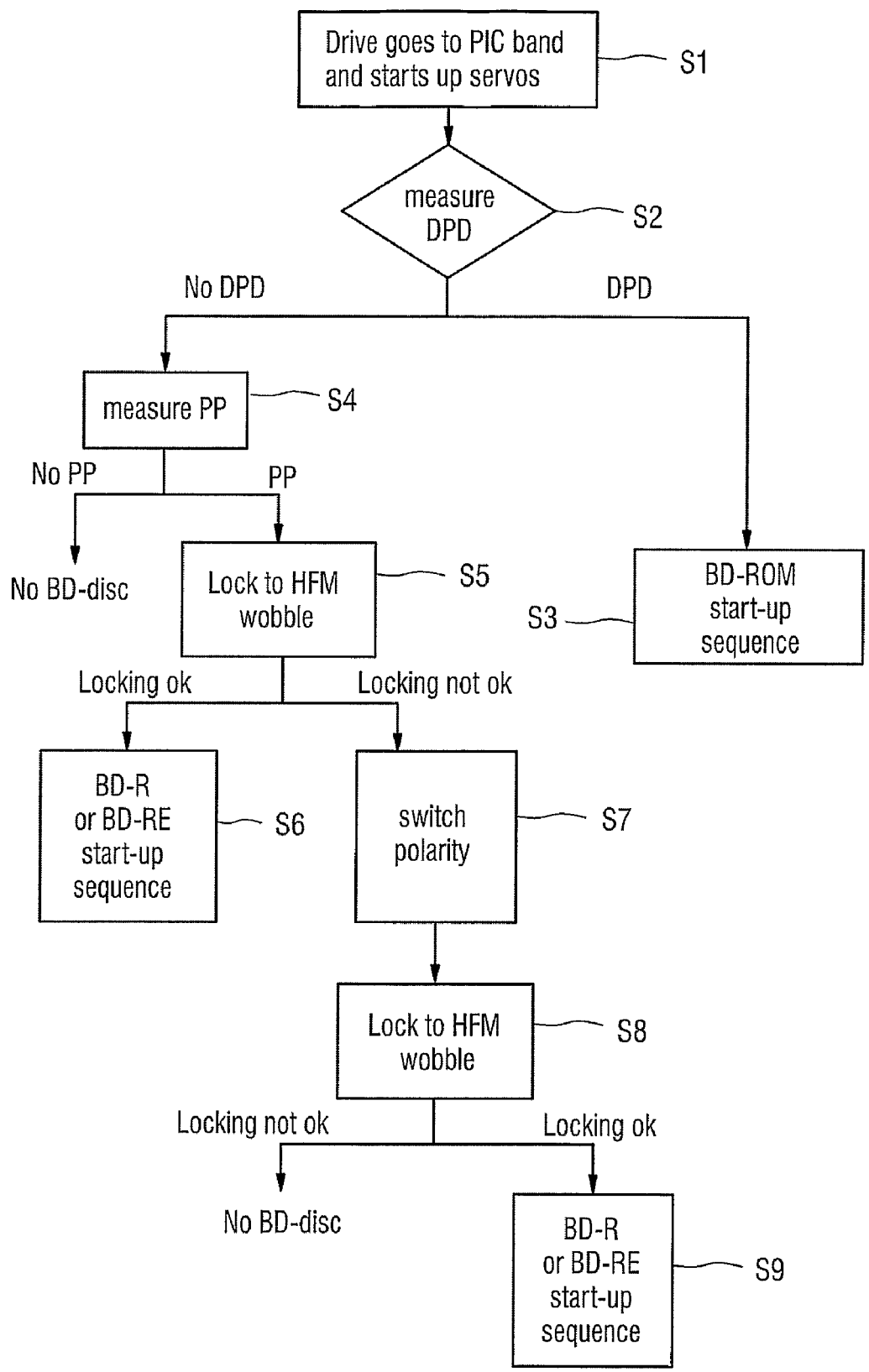
Figure 3:
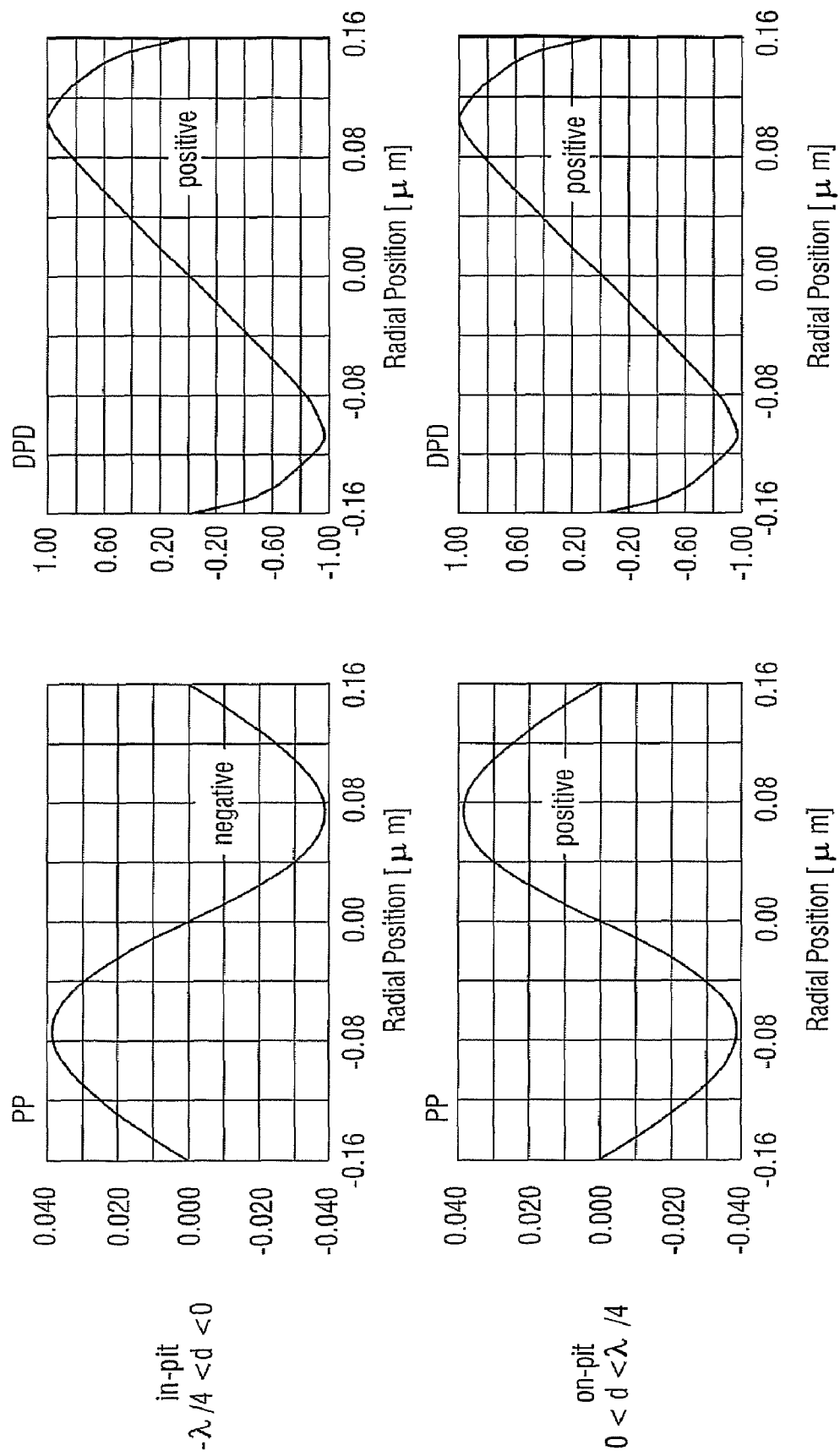
Figure 4:
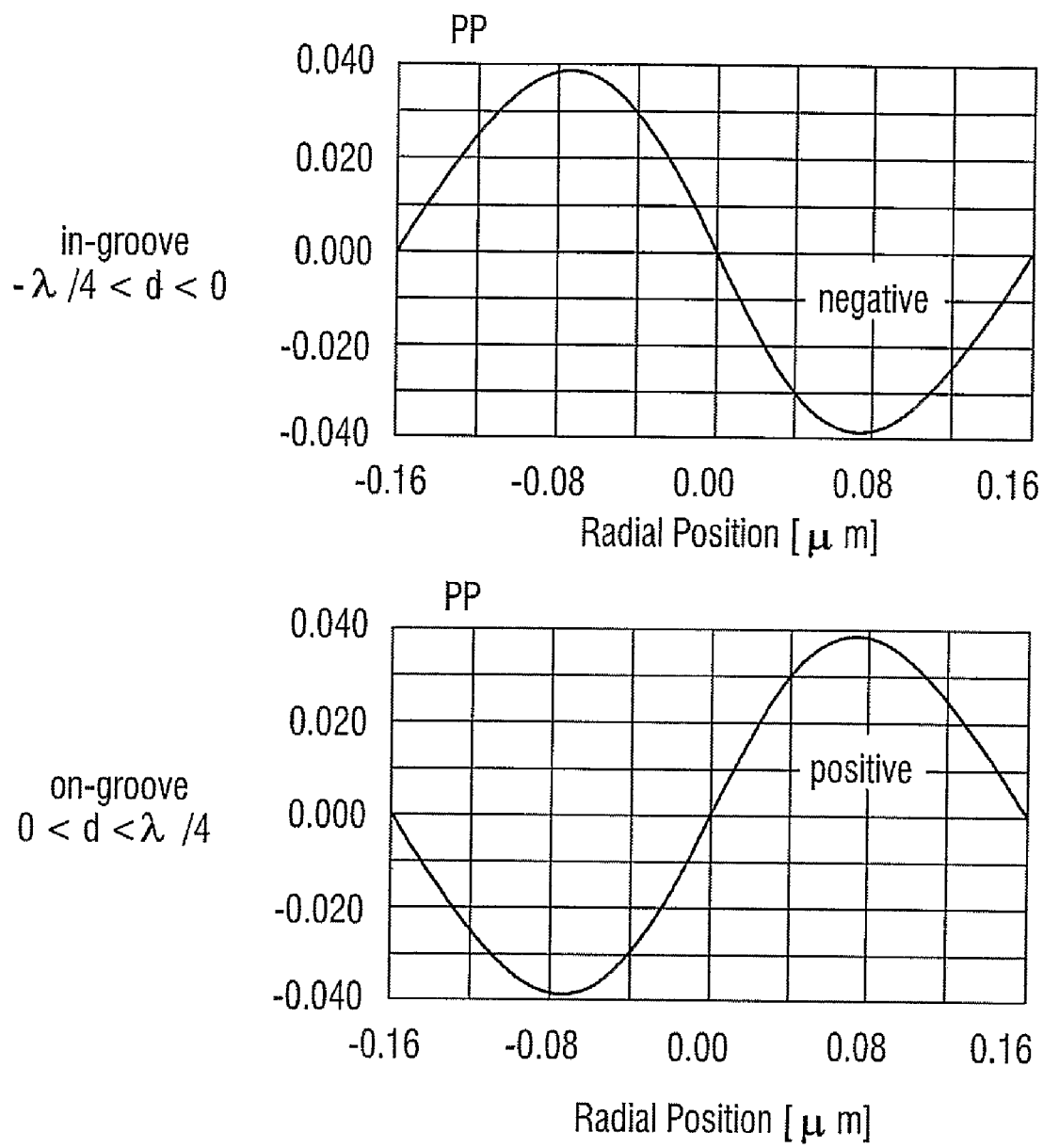

The invention will now be explained in more detail with reference to the accompanying drawings in which FIG. 1 shows a block diagram illustrating a drive according to the present invention, FIG. 2 shows a flow chart illustrating the steps of a method according to the present invention, using a BD disc as a particular example, FIG. 3 shows typical PP and DPD signals in the PIC area for the in-pit and on-pit case for BD-ROM, and FIG. 4 shows typical PP signals in the PIC area for the in-groove and on-groove case for BD-R/RE.

FIG. 1 schematically shows a drive 1 according to the present invention for accessing a record carrier 2, for example a BD disc, in order to read data from or to write data to the record carrier 2 by use of a read/write unit 3. In order to successfully read/write data an optical pick-up unit (not shown) needs to follow the tracks on a record carrier during rotation of the record carrier 2. For this purpose, a servo system uses a tracking signal. The way of tracking is different for, on the one hand, read-only type record carriers (ROM) and, on the other hand, recordable/write-once and rewritable type record carriers (R, RW, RE). This because generally no user data bits are present on newly purchased recordable and rewritable media in contrast to read-only media were data bits are present.

When a disc 2 is inserted into the drive 1 a start-up procedure begins. During this procedure servo signals and disc-related information are retrieved from the disc and a test procedure begins. A drive will generally perform its start-up procedure in a lead-in zone of the disc Such a start-up procedure includes, for example, focus-capturing and focus offset calibration, cover layer thickness compensation, and disc tilt calibration. In particular for BD discs, the lead-in zone contains a PIC area (Permanent Information and Control data) where the relevant start-up information is stored, which information can be retrieved from the disc by a drive.

With regard to the tracking there are two types of signals that are typically used in the system. These are the Differential Phase Detection (DPD) signal and the Push-Pull (PP) signal. The two types of signals are a measure for the deviation of the optical spot from the nominal track position.

The DPD signal is defined as the phase difference between the sums of the currents from diagonal pairs of elements of a, generally 4-quadrant, photo detector at specific radial offset, expressed as a fraction of the channel bit clock period. This PDP signal results from the data bits which are present in the disc (for example in the form of embossed pits). Therefore, this tracking signal is usually used in the ROM type of media where the data bits are always present. The pit-land structure of the data generates a diffraction pattern, the interference of overlapping orders of which is used as input.

Since R, RW and RE media may be blank (that is, no user data bits are present) a DPD signal will not always be generated. In order to generate a tracking signal by (blank) discs a groove structure in the disc is applied. This groove is replicated into the disc during manufacture and, generally, has the shape of a concentric spiral. A servo-mechanism can now follow this groove spiral on the disc. When scanning the groove structure a diffraction pattern is created. The interference between overlapping diffraction orders is used for tracking. The resulting PP signal has the property that it is zero when scanning on the tracks and in between the tracks. However, the tracking polarity for these cases is opposite.

It is noted the data bits on read-only type discs may also generate some PP signal.

The PP signal is actually an error signal. It is a measure for being off-track: the larger its value, the more the optical spot deviates from the nominal tracking direction along the groove spiral of a disc. This error signal is used as a servo signal to control the radial position of the optical spot when scanning the optical disc along the spiral. When the servo loop is closed the optical spot is on the nominal tracking direction and the PP error signal is zero.

More details regarding the DPD signal and the PP signal are defined in the various optical system standards, to which reference is herewith made.

For rewritable and recordable media generally a pre-mastered groove with a wobble feature is present on the disc. A disc can be of the on-groove type or of the in-groove type. The on-groove type is defined such that the groove structure is closer to the objective lens that the surrounding land, and vice versa for the in-groove type. From a drive point of view the polarity of the push-pull tracking signal is opposite for these two types. A drive can not easily determine the polarity, except by a trial-and-error-method.

In the older optical recording formats, like CD-R, CD-RW and DVD+R/+RW, the data written on the disc was always recorded on-groove. So there was no problem for the drive to determine the correct tracking polarity.

In the BD-ROM case the polarity of the DPD tracking signal is insensitive for an in-pit or on-pit type of disc. The drive always receives the same DPD polarity independent of the type of the pits. However, the polarity of the push-pull signal, which may be generated by these pits, does differ for these two types. In FIG. 3 the in-pit and on-pit PP and DPD tracking signals are depicted for the PIC area of a BD-ROM disc. It is clearly shown that the polarity of the PP signals is inverted for the in-pit and on-pit case, while the DPD signals do not have an inverted polarity.

In FIG. 4, the in-groove and on-groove PP tracking signals are depicted for the PIC area of a BD-R/RE disc. As can be seen, the PP signal again has an inverted polarity in the in-groove case compared to the on-groove case. No DPD signal is generated when scanning the PIC area of a BD-R/RE.

In case of BD discs, and possibly of future optical storage systems, different tracking polarities are possible so that the drive does not know the correct tracking polarity in advance. It needs to determine the tracking polarity before the correct start-up procedure can be performed. In the embodiment of the drive shown in FIG. 1 means 4 for determining the type of record carrier are therefore provided. In his embodiment said means 4 are not only able to distinguish between a ROM and a non-ROM type disc, but are further adapted for determining the polarity in case the record carrier is a recordable or rewritable record carrier. A corresponding method for determining the type of record carrier and for determining the tracking polarity is illustrated in FIG. 2.

In an initial step (S1) the drive goes to the PIC band of a disc and settles the focus-servo and the cover-layer thickness compensation servo, i.e. the drive focuses on the correct recording layer of the disc in case of a multi-layer disc. Thereafter, in a subsequent step (S2) the DPD signal is measured (from the PIC band) by an appropriate DPD measuring unit 41, i.e. by calculation of the phase difference between the sums of the currents from diagonal pairs of elements of a 4-quadrant photo detector at a specific radial offset, expressed as fraction of the channel bit clock period. If the amplitude of the DPD signal is sufficiently large, this is a unique indication the disc is a ROM type disc, and the ROM-specific start-up sequence will be continued (S3).

When no DPD signal is found it can be a blank disc so that as a next step S4 the PP signal is measured by an appropriate PP measuring unit 42. If the amplitude of the PP signal is sufficiently large, this is an indication that the disc is a recordable or a rewritable type of disc. Otherwise it is very likely that the disc is not of the assumed storage system family, i.e. in the example illustrated in FIG. 2 that it is not a BD disc. In this case the drive will generate a corresponding error signal or try a different start-up procedure for a record carrier of a different storage system family.

In the next step S5 the groove-polarity is checked by a wobble locking unit 43. After closing the PP-servo with one of the two possible tracking polarities (preferably with that of the most occurring type of blank discs) it is tried to lock to the wobble signal in the PIC band. If the wobble lock is successful the drive knows that the actual disc is a BD-R or BD-RE disc, and the drive reads out the PIC information and continues the BD-R or BD-RE start-up sequence (S6). Tracking has probably been performed with the wrong polarity when no lock to the wobble signal is possible. Now a switch is made to the other tracking polarity in step S7 and PIC wobble locking is tried again in step S8. When successful, the drive knows that it deals with a BD-R or BD-RE disc with opposite track polarity, and it can continue the BD-R or BD-RE start-up sequence (S9). If the wobble-lock remains unsuccessful, the disc is not a BD-disc, leading to the consequence as explain above.

For indicating which type of record carrier is inserted in the drive and which kind of tracking polarity it has (in case of a recordable or rewritable record carrier) an appropriate indication unit 44 is provided issuing a first indication signal indicating the type of the record carrier (read-only type record carrier or a recordable/rewritable type record carrier). In a further embodiment the indication unit 44 further issues a second indication signal indicating, in case of a recordable or a rewritable record carrier, which kind of polarity the record carrier has.

An embodiment of the present invention makes use of the fact that, at least for BD record carriers, there is a clear difference between ROM and R/RE when considering the tracking signals obtained form reading the PIC area. BD-ROM discs always shows DPD signals in the PIC area. Blank and written BD-R/RE never shows DPD signals in this PIC area as writing is prohibited and only a groove is present. At other areas on the disc this clear difference is not guaranteed since BD-R/RE discs might have some amount of DPD signal if user data is present.

The present invention provides a quick and unique solution for determining the type of record carrier, in particular for distinguishing between a ROM type and a non-ROM type disc. Furthermore, a solution is provided for determining the type of polarity in case of a recordable/rewritable type record carrier.

The invention claimed is:

1. Drive (1) for accessing an optical record carrier (2) comprising means (4) for determining the type of record carrier, in particular for distinguishing a read-only type record carrier from a recordable or rewritable type record carrier having a wobbled groove, said means comprising:

a DPD measuring unit (41) for measuring the differential phase detection (DPD) signal, a PP measuring unit (42) for measuring the push-pull (PP) signal in case no DPD signal could be measured, and an indication unit (44) for generating a first indication signal indicating that the record carrier is a read-only type record carrier if a DPD signal could be measured and indicating that the record carrier is a recordable or rewritable type record carrier if no DPD signal but a PP signal could be measured.

2. Drive as claimed in claim 1, wherein said means (4) for determining the type of record carrier further comprise:

a wobble locking unit (43) for locking, in case a PP signal could be measured, to the wobble embedded in said wobbled groove using a first and/or a second polarity setting, and wherein the indication unit (44) is adapted for generating a first indication signal indicating that the record carrier is a read-only type record carrier if a DPD signal could be measured and indicating that the record carrier is a recordable or rewritable type record carrier if no DPP signal but a PP signal could be measured and if locking to the wobble has been successful.

3. Drive as claimed in claim 2, wherein said means (4) for determining the type of record carrier are further adapted for determining the polarity of a recordable or rewritable record carrier, and wherein said indication unit (44) is further adapted for generating a second indication signal indicating, in case of a recordable or rewritable record carrier, that the recordable or rewritable record carrier has a first or a second polarity depending on the polarity setting for which the locking to the wobble has been successful.

4. Drive as claimed in claim 2, wherein said indication unit (44) is adapted indicating in said first indication signal that the record carrier is of a different optical record carrier standard in case no PP signal could be measured or locking to the wobble has not been successful.

5. Drive as claimed in claim 2,
wherein said wobble locking unit (43) is adapted for locking, in case a PP signal could be measured, to the wobble embedded in said wobbled groove using a first polarity setting, in particular a polarity setting of the most occurring recordable or rewritable record carriers, and, in case locking was not successful, for locking to the wobble embedded in said wobbled groove using a second polarity setting.

6. Drive as claimed in claim 2,
wherein said first polarity setting is an on-groove polarity setting and said second polarity setting is an in-groove polarity setting.

7. Drive as claimed in claim 1,
wherein said means (4) are adapted for determining the type of record carrier among the different types of record carriers of the BD standard.

8. Drive as claimed in claim 1,
wherein said DPD measuring unit (41) is adapted for accessing the PIC area of the record carrier for measuring the DPD signal.

9. Method of determining the type of optical record carrier, in particular for distinguishing a read-only type record carrier from a recordable or rewritable type record carrier having a wobbled groove, comprising the steps of:

measuring the differential phase detection (DPD) signal,
measuring the push-pull (PP) signal in case no DPD signal could be measured, and
generating a first indication signal indicating that the record carrier is a read-only record carrier if a DPD signal could be measured and that the record carrier is a recordable or rewritable record carrier if no DPD signal but a PP signal could be measured.

10. Method as claimed in claim 9, further comprising the step of:
locking, in case a PP signal could be measured, to the wobble embedded in said wobbled groove using a first and/or a second polarity setting, and of
generating a first indication signal indicating that the record carrier is a read-only record carrier if a DPD signal could be measured and that the record carrier is a recordable or rewritable record carrier if no DPD signal but a PP signal could be measured and if locking to the wobble has been successful.

11. Computer program encoded as variations in physical properties of a physical computer readable media and when the variations in the physical media are read by a computer from the media it results in physical structures in the memory of the computer that correspond to the variations, the memory structures controlling the operation of a processor of the computer for causing the computer to carry out the steps of the method as claimed in claim 9.

\* \* \* \* \*